(12) United States Patent
Johnson et al.

(10) Patent No.: US 8,973,752 B2
(45) Date of Patent: Mar. 10, 2015

(54) FLASH ISOLATION FOR DEVICE COVERS

(75) Inventors: Jamie Johnson, Fort Collins, CO (US);
Stephen Willes, Fort Collins, CO (US);
William Travis Smith, Fort Collins, CO (US); Alan Morine, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 97 days.

(21) Appl. No.: 13/186,583

(22) Filed: Jul. 20, 2011

(65) Prior Publication Data
US 2012/0018323 A1    Jan. 26, 2012

Related U.S. Application Data

(60) Provisional application No. 61/365,985, filed on Jul. 20, 2010.

(51) Int. Cl.
*B65D 85/38* (2006.01)
*B65D 85/00* (2006.01)

(52) U.S. Cl.
CPC ...... *H04B 1/3888* (2013.01); *G03B 2215/0589* (2013.01); *G06F 2200/1633* (2013.01)
USPC ...................... 206/316.2; 206/316.1; 206/320

(58) Field of Classification Search
USPC ........ 348/371; 361/679.56; 206/361.2, 361.1; 396/448
See application file for complete search history.

(56) References Cited

U.S. PATENT DOCUMENTS

| | | | |
|---|---|---|---|
| 3,832,725 A * | 8/1974 | Cook | 396/27 |
| 5,175,873 A * | 12/1992 | Goldenberg et al. | 455/351 |
| 6,075,944 A * | 6/2000 | Balling et al. | 396/6 |
| 6,941,066 B2 | 9/2005 | Kawakami | |
| D574,819 S | 8/2008 | Andre et al. | |
| D575,056 S | 8/2008 | Tan | |
| D582,149 S | 12/2008 | Tan | |
| D597,089 S | 7/2009 | Khan et al. | |
| D603,603 S | 11/2009 | Laine et al. | |
| D606,751 S | 12/2009 | Andre et al. | |
| D610,807 S * | 3/2010 | Bau | D3/269 |
| D611,465 S * | 3/2010 | Corley et al. | D14/248 |
| D622,716 S | 8/2010 | Andre et al. | |
| 7,927,028 B2 | 4/2011 | Chan | |
| 7,933,122 B2 | 4/2011 | Richardson | |
| 8,245,842 B2 * | 8/2012 | Bau | 206/320 |
| 2008/0058006 A1 * | 3/2008 | Ladouceur | 455/556.1 |
| 2008/0316687 A1 | 12/2008 | Richardson | |
| 2009/0074400 A1 * | 3/2009 | Machida et al. | 396/448 |
| 2009/0080153 A1 * | 3/2009 | Richardson et al. | 361/679.56 |
| 2010/0096284 A1 * | 4/2010 | Bau | 206/320 |
| 2010/0183290 A1 * | 7/2010 | Yang et al. | 396/448 |
| 2011/0073608 A1 | 3/2011 | Richardson | |
| 2011/0157800 A1 | 6/2011 | Richardson | |

FOREIGN PATENT DOCUMENTS

JP    2008018637    1/1996

* cited by examiner

*Primary Examiner* — Anthony Stashick
*Assistant Examiner* — Kaushikkumar Desai

(57) ABSTRACT

A cover for a camera device with a flash may incorporate a light absorbing isolation mechanism in areas near the flash and camera. In some cases, the isolation mechanism may be conformable to press against the camera device, or may come in partial contact or no contact with the device in the area of the flash and camera. The isolation mechanism may be formed as part of a cover, or may be a second component that may be added to a cover in various designs. The isolation mechanism may operate with devices that have a glass or other translucent outer case, as well as those devices without such an outer case.

19 Claims, 9 Drawing Sheets

FLASH ISOLATION FOR DEVICE COVERS

BACKGROUND

Many smartphone and handheld electronic devices include a camera and flash on the device, sometimes close together on the device. Some cameras on these devices may produce very high quality pictures similar to high quality single lens reflex digital cameras.

SUMMARY

A cover for a camera device with a flash may incorporate a light absorbing isolation mechanism in areas near the flash and camera. In some cases, the isolation mechanism may be conformable to press against the camera device, or may come in partial contact or no contact with the device in the area of the flash and camera. The isolation mechanism may be formed as part of a cover, or may be a second component that may be added to a cover in various designs. The isolation mechanism may operate with devices that have a glass or other translucent outer case, as well as those devices without such an outer case.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An isolation mechanism may be used in a protective cover to limit any optical reflections on devices that have both a flash and a camera. The isolation mechanism may be a dark colored portion of the cover near the camera that absorbs light, including reflected light that may otherwise be captured by the camera.

The isolation mechanism may be a portion of a cover that is separately manufactured and added to a cover. The cover may be predominately a hard shell cover to which an isolation mechanism may be adhered.

In some embodiments, the isolation mechanism may be integral to the design of a cover. Such embodiments may include those where a flexible isolation mechanism may be molded onto a hard shell cover, or where the isolation mechanism is formed as part of a flexible cover.

The isolation mechanism may absorb light that may otherwise be reflected off of the protective cover from incoming light or reflected from a flash operating nearby the camera. In some devices, the flash and camera may be placed behind a glass or other transparent skin of the device, which may cause light to propagate through the transparent skin. An optically absorptive isolation mechanism may limit the reflected, refracted, or otherwise propagated light without distortion.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
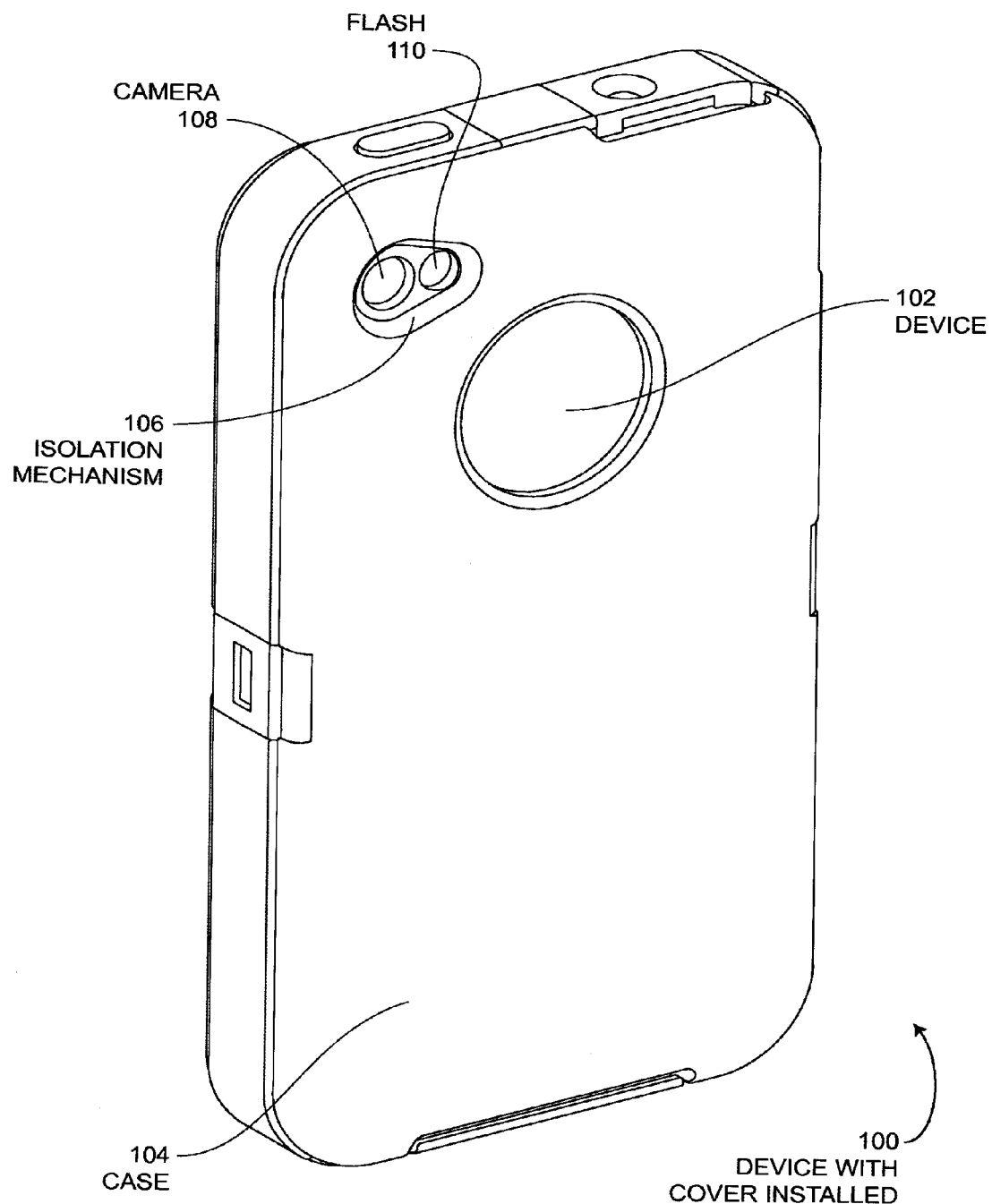
FIG. 1 is an isometric illustration of an embodiment showing a device with a cover installed.

FIG. 1 is an isometric view of an embodiment 100 showing a device with a protective cover installed.

The device 102 is illustrated as a cellular telephone. The device 102 may also be a digital camera, tablet computer, laptop computer, handheld scanner, or any other device that may include a camera.

The case 104 may be a protective cover for the device 102. The case 104 may be a ruggedized case that may be waterproof in some embodiments, or provide some degree of damage protection to the device 102.

In some embodiments, the case 104 may be a decorative cover for the device 102. In such embodiments, the case 104 may have a particular color, pattern, or other decorative features. Such embodiments may provide different levels of damage protection, from high degree of protection to very little, if any.

The case 104 may have an isolation mechanism 106 in the area of the device's camera 108 and flash 110. The isolation mechanism 106 may limit optical interference from the case 104 to the camera 108.

In many embodiments, the isolation mechanism 106 may be black in color to absorb light. Some embodiments may also manufacture the isolation mechanism 106 with a finish that is not shiny. Such a finish may be a textured finish, such as matte, orange peel, or any other texture.

Figure 2:
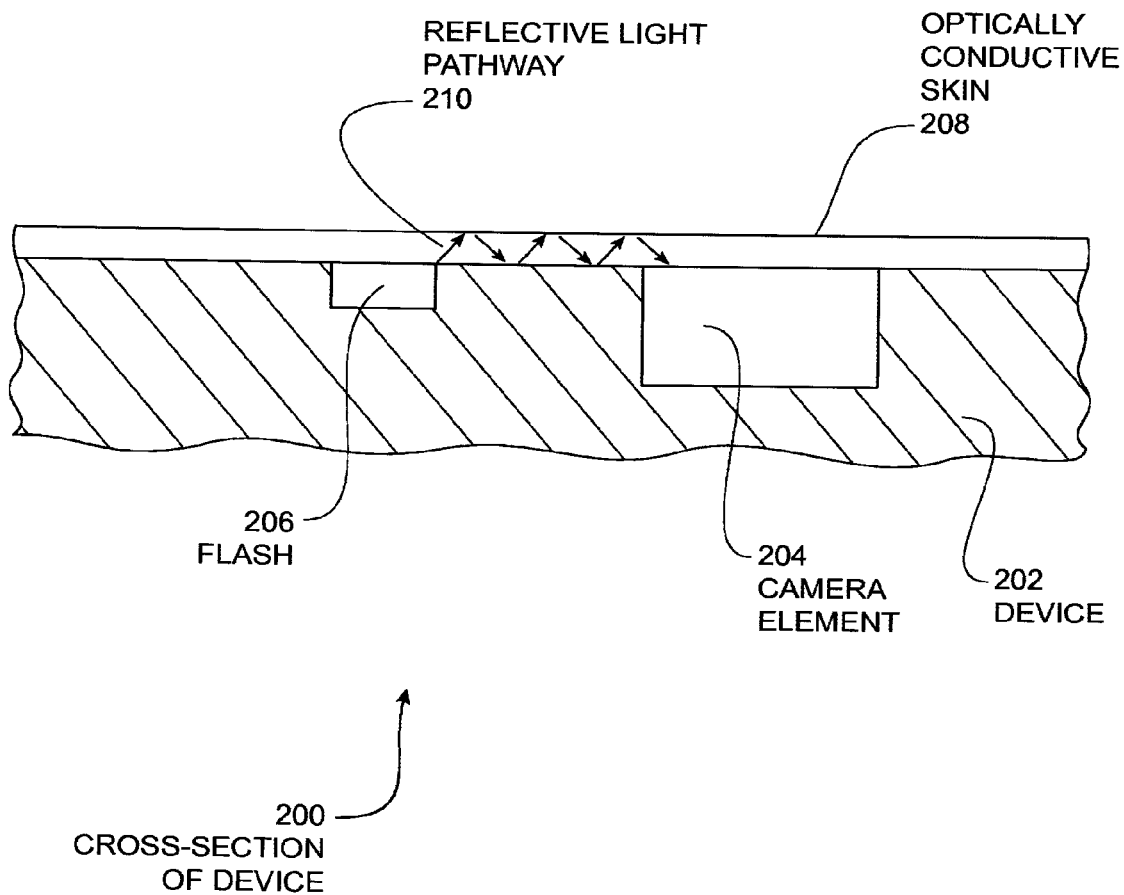
FIG. 2 is a cross-sectional illustration of a detailed view of a device with a camera and flash.

FIG. 2 illustrates a schematic cross-sectional embodiment 200 illustrating a device with an optically conductive skin. A device 202 may have a camera 204 and flash 206 mounted in the body of the device 202. Embodiment 200 is not to scale.

The device 202 may be a cellular telephone or other device that has a camera and flash components. The camera and flash may be mounted near each other on the device such that the flash may illuminate a subject that may be captured using the camera.

Some devices may have an optically conductive skin 208. The optically conductive skin may be manufactured from glass, plastic, or other material. The selection of glass or other materials for the outside surface of the device 202 may give the device a distinctive look and feel, as well as resistance to scratches or other qualities.

In cases where an optically conductive skin is used, there may be a reflective light pathway 210 that may allow some light from the flash 206 to migrate to the camera element 204. The reflective light pathway 210 may show light beams that originate with the flash as reflecting between the top and bottom surfaces of the skin 208 to propagate along the skin 208.

The propagation of light along the skin 208 may be a factor of the surface coating on the skin 208, the initial angle of incidence of the light beams coming in contact with the skin 208, as well as other factors. In some instances, the skin 208 may have an opaque surface on the inside surface of the skin 208, which may be applied using silk screening or other techniques. Such instances may not have an opaque coating in the vicinity of the camera 204 and flash 208 so that light may pass through the skin 208 in those areas. The areas where the opaque coating is not present may be areas where light may enter the skin 208 and propagate to other areas where the opaque coating is not present.

Items that come in contact with the optically conductive skin 208 may cause changes in the light pathway 210. For example, a red colored item in contact with the outer surface of the skin 208 in the area of the pathway 210 will cause the light in the pathway to change to red. This may leave a red colored haze, distortion, or other artifact in the image captured by the camera 204.

On a protective or decorative case for the device, such artifacts may be minimized or eliminated by using an optical isolation mechanism that may be located very near the flash and camera. The optical isolation mechanism may be a dark colored portion of the case that may have an orifice or hole through which light may pass for the flash and camera.

The isolation mechanism may be black colored so that any light that seeps out of the optically conductive skin 208 may be absorbed and not reflected back into the skin 208. Further, the isolation mechanism may minimize reflections from light that is being captured by the camera or broadcast by the flash.

Figure 3:
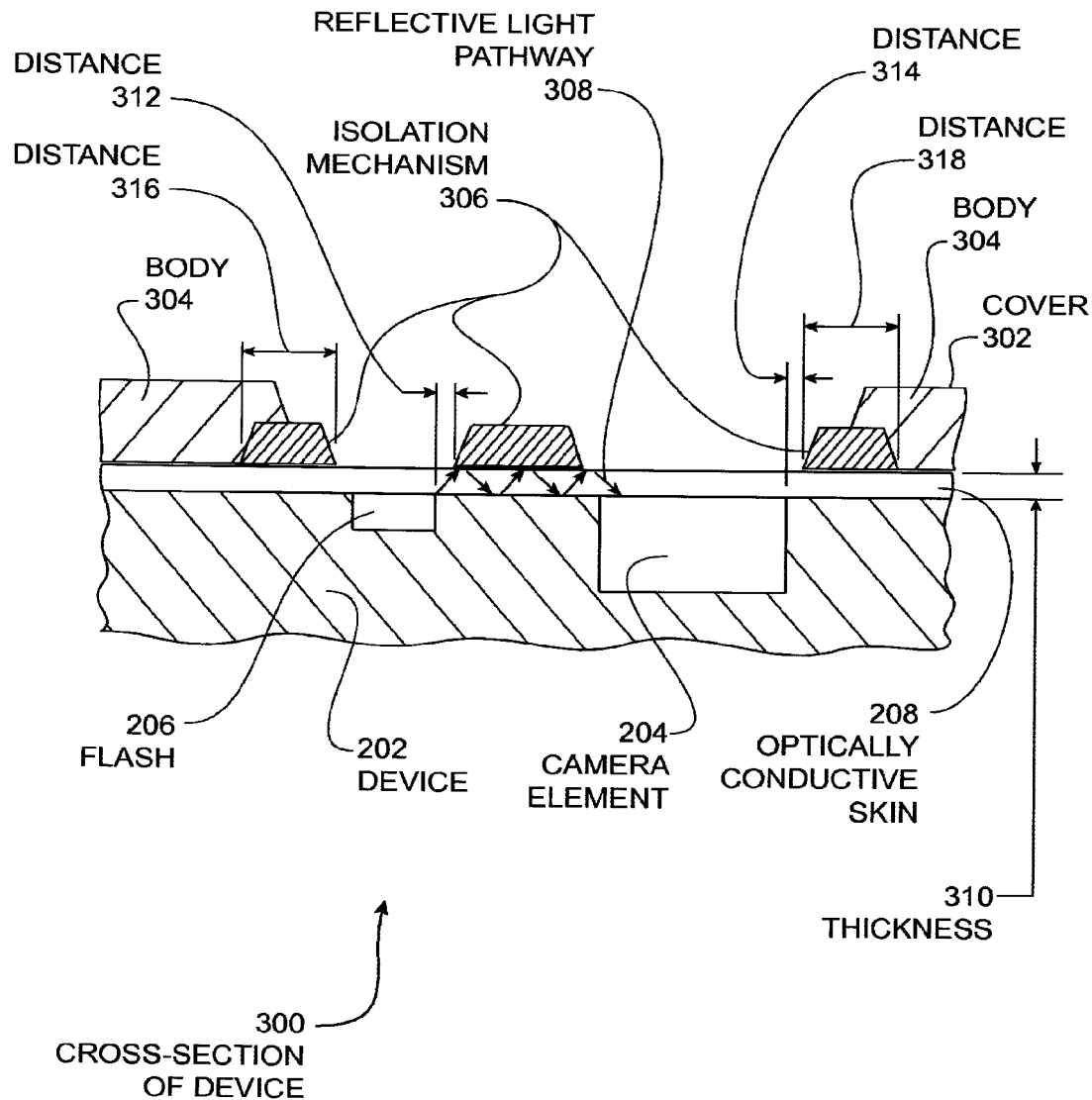
FIG. 3 is a cross-sectional illustration of a detailed view of the embodiment of FIG. 2 with a cover installed.

FIG. 3 illustrates a schematic cross-sectional embodiment 300 illustrating the device from embodiment 200 fitted with a removable cover. The device 202 is shown with the camera 204 and flash 206 mounted in the body of the device 202. Embodiment 200 is not to scale.

The device 202 is illustrated with a cover 302 that is mounted to the outside of the device 202. The cover 302 may have a body 304 and an isolation mechanism 306. The isolation mechanism 306 may be illustrated as a component of the cover 302.

The body 304 may have a large hole that may be oriented over the camera 204 and flash 206 when the cover 302 is installed on the device 202. In embodiment 300, the hole spans both the camera 204 and flash 206. Other embodiments may have separate holes for the camera 204 and flash 206.

In some embodiments, the body 304 may include a transparent cover that may span an opening through which the camera 204 and flash 206 may operate. Such embodiments may be waterproof in some instances.

The skin 208 may have a thickness 310.

The isolation mechanism 306 is illustrated as being offset from the flash 206 by a distance 314 and as being offset from the camera 204 by the distance 312. The distances 314 and 312 may be less than the thickness 310, equal to the thickness 310, or greater than the thickness 310. In some cases, the distances 314 and 312 may be between 1.0 and 1.5 times the thickness 310, 1.5 times and 3.0 times the thickness 310, 3.0 times to 10.0 times the thickness 310, or greater than 10.0 times the thickness 310.

In some embodiments, the distances 312 and 314 may be the same, while other embodiments may have different distances 312 and 314. Some embodiments may have distance 312 larger than distance 314, and other embodiments may have distance 314 larger than distance 312.

Some embodiments may have a skin thickness ranging between 0.025 in and 0.100 in.

The isolation mechanism 306 is also illustrated as extending a distance 316 inside the cover 302 near the flash 206 and a distance 318 near the camera 204. The distances 316 and 318 may be less than the thickness 310, equal to the thickness 310, or greater than the thickness 310. In some cases, the distances 316 and 318 may be between 1.0 and 1.5 times the thickness 310, 1.5 times and 3.0 times the thickness 310, 3.0 times to 10.0 times the thickness 310, or greater than 10.0 times the thickness 310.

In some embodiments, the distances 316 and 318 may be the same, while other embodiments may have different distances 316 and 318. Some embodiments may have distance 316 larger than distance 318, and other embodiments may have distance 318 larger than distance 316.

The isolation mechanism 306 may be manufactured in different manners. In some instances, the isolation mechanism 306 may be an insert that may be separately manufactured and installed into the body 304 by snap fit, fasteners, adhesives, secondary molding, or some other manufacturing process. In some instances, the isolation mechanism 306 may be a portion of the body 304 that has a different color and, in some cases, a different texture than the body 304. In some such instances, the isolation mechanism 306 may be defined by painting, silk screening, or other surface treatments in the area defined by the isolation mechanism 306.

Figure 4:
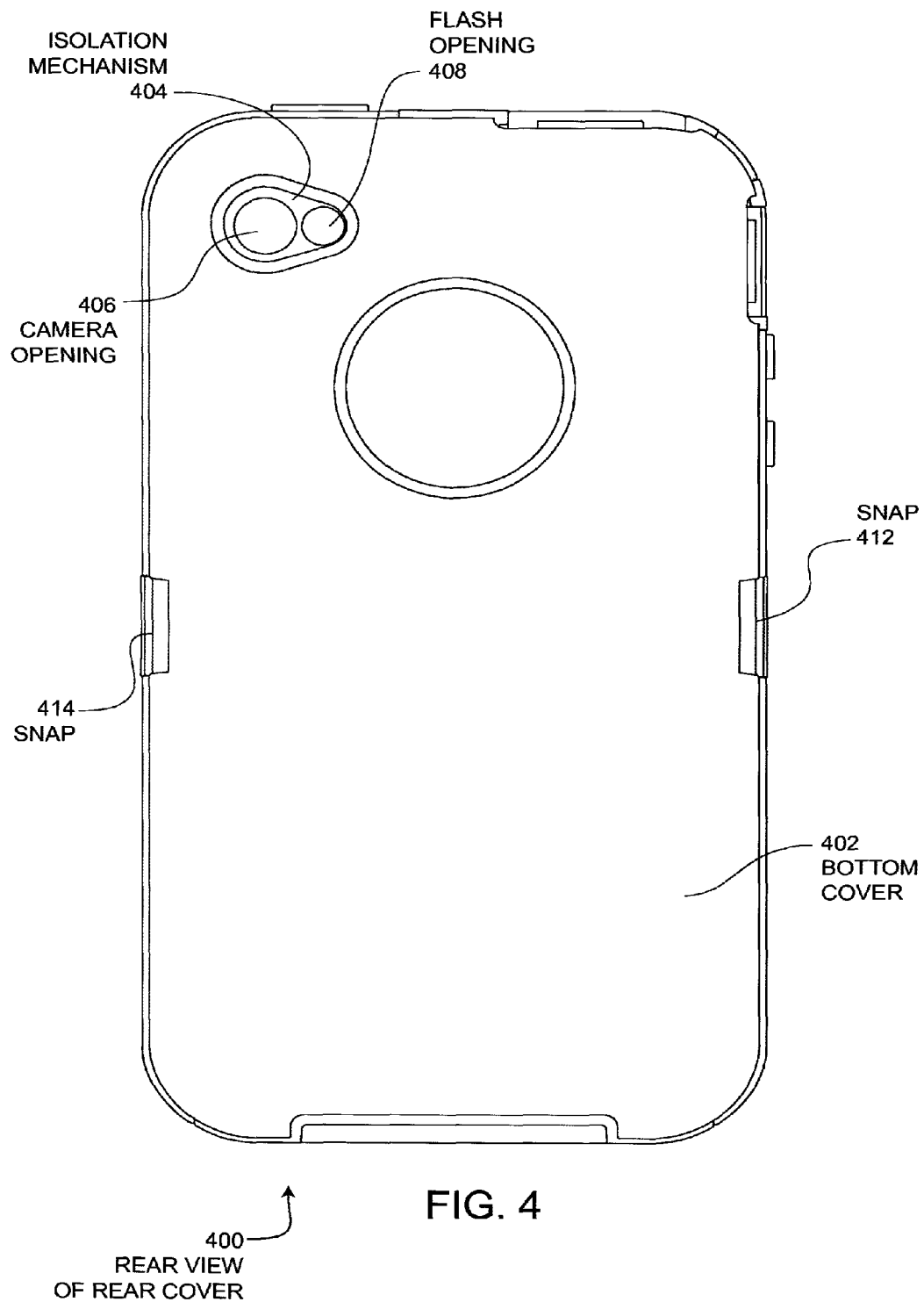
FIG. 4 is a rear view of another embodiment of cover for a device.

FIG. 4 is a rear view of an embodiment 400 showing a cover for a cellular telephone. Embodiment 400 illustrates a bottom cover 402.

The bottom cover 402 may include an isolation mechanism 404 that may be attached through a secondary molding operation. The isolation mechanism 404 may include a camera opening 406 and a flash opening 408.

The isolation mechanism 404 may include a rib or other conformable feature that may come in contact with or conform to the surface of the cellular telephone in the area near the telephone's camera and flash.

The bottom cover 402 may be attached to a mating top cover and capture a cellular telephone using snaps 412 and 414. The snaps may cause the some compression forces between the two covers, which may cause the isolation mechanism 404 to compress when the cover is installed on a cellular telephone.

Figure 5:
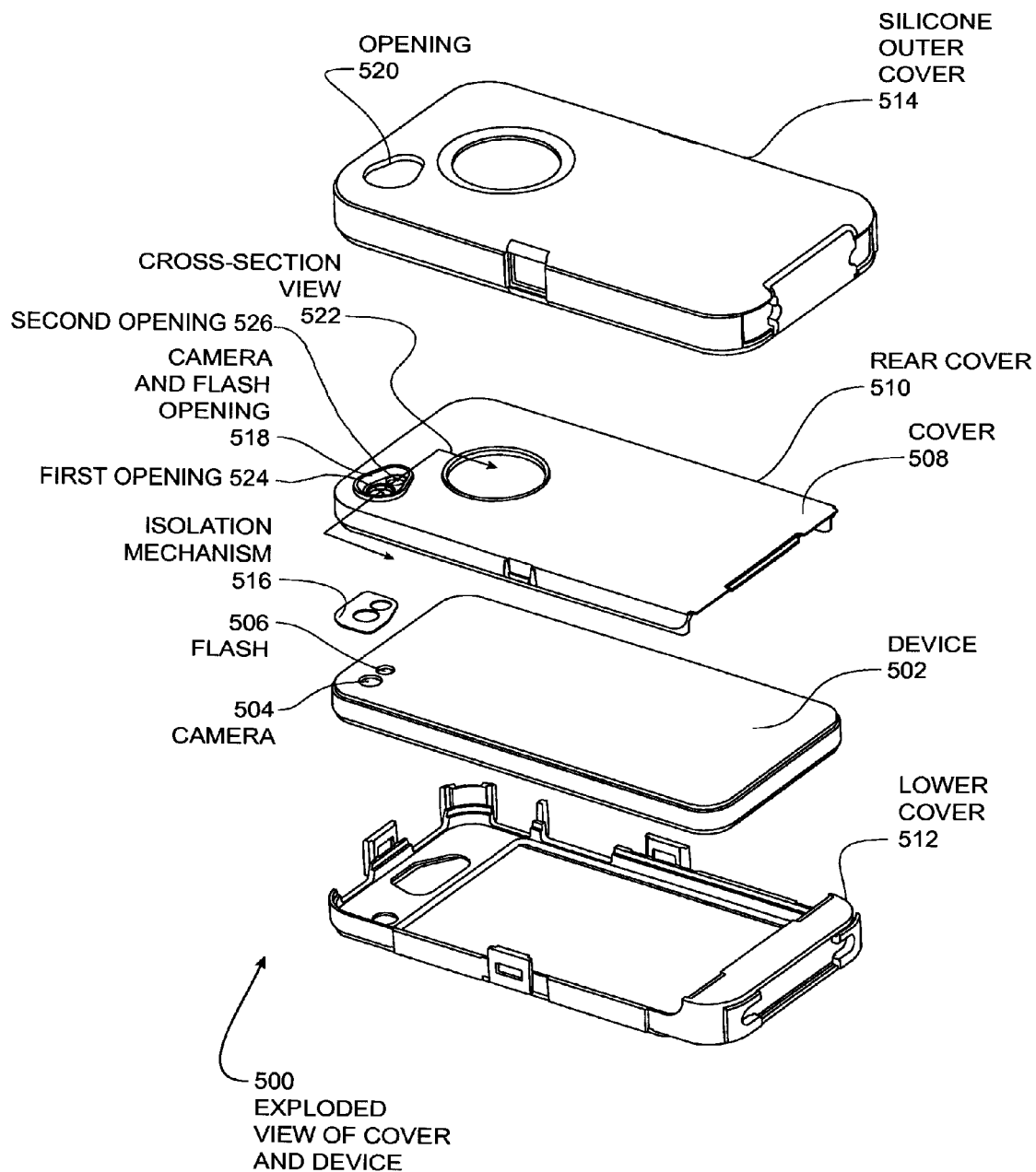
FIG. 5 is an isometric exploded view of yet another embodiment showing a device with a cover.

FIG. 5 is an isometric view of an embodiment 500 showing an exploded view of another embodiment of a cover for a cellular telephone. The device 502 may be a cellular telephone that includes a camera 504 and a flash 506.

Embodiment 500, shown in FIG. 5, illustrates a device 502, a hard cover 508 that includes a rear cover 510 with a first opening 524 and a second opening 526, a lower cover 512, and a silicone outer cover 514 with an opening 520. The cover may be installed on the device 502 by capturing the device 502 with the rear cover 510 and lower cover 512, then installing the flexible, stretchable, silicone outer cover 514 over the assembly. The installed cover may have two layers of protection for the device 502.

The hard cover 508 may include a camera and flash opening 518 that may be molded into the cover 508. An isolation mechanism 516 may be mounted to the underside of the cover 508, between the cover 508 and the device 502.

The isolation mechanism may be a felt, foam, silicone, or other material that may act as a gasket between the cover 508 and the device 502. The isolation mechanism may be installed using pressure sensitive adhesive or other attachment mechanism to the cover 508. Many such embodiments may be die cut from a stock material to which pressure sensitive adhesive may be pre-applied. Installation of the isolation mechanism may be performed by removing a backing layer to the die cut part and adhering the isolation mechanism to the rear cover 510.

Figure 6:
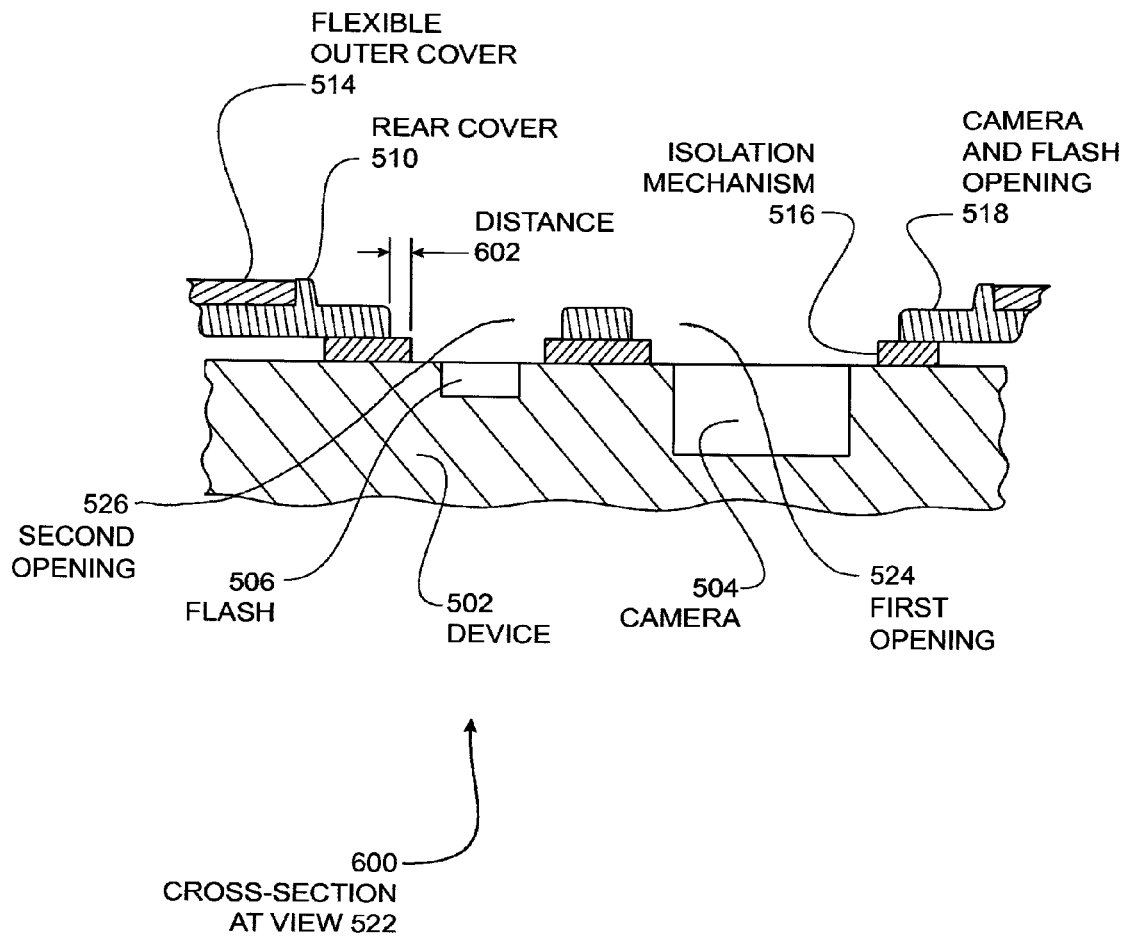
FIG. 6 is a cross-sectional illustration of a detailed view of the embodiment of FIG. 5.

Embodiment 500 includes a cross-section view 522 which may be illustrated in FIG. 6.

FIG. 6 is a cross-section view of an embodiment 600 showing details of cross-section view 522. Embodiment 600 is not to scale.

Embodiment 600 illustrates an isolation mechanism 516 that may be applied between a cover and a device 502. The isolation mechanism 516 may be a conformable material, such as felt, silicone, foam, or other material. In many embodiments, the isolation mechanism 516 may be compressed against the device 502 when the rear cover 510 is attached to the device 502.

Device 502 is illustrated as having a camera 504 and flash 506. In some embodiments, device 502 may include a transparent or optically conductive skin, which is not illustrated in embodiment 600.

The isolation mechanism 516 is placed between the rear cover 510 and the device 502 in the area of the camera and flash opening 518. The isolation mechanism 516 may be placed so that the isolation mechanism is inside the opening 518 by a distance 602.

The distance 602 may indicate that the isolation mechanism 516 is at least partially visible in the area of the camera and flash opening 518, indicating that holes for the camera and flash in the isolation mechanism 516 are smaller than corresponding openings in the camera and flash opening 518. Such arrangements may limit the reflections and discoloration of incoming and outgoing light through the openings.

The cover may include a rear cover 510 that may be manufactured of hard or relatively rigid plastic, over which a silicone outer cover 514 may be placed. In many embodiments, the silicone outer cover 514 may be a stretchable or conformable material that a user may stretch to place over the previously installed rear cover 510.

Figure 7:
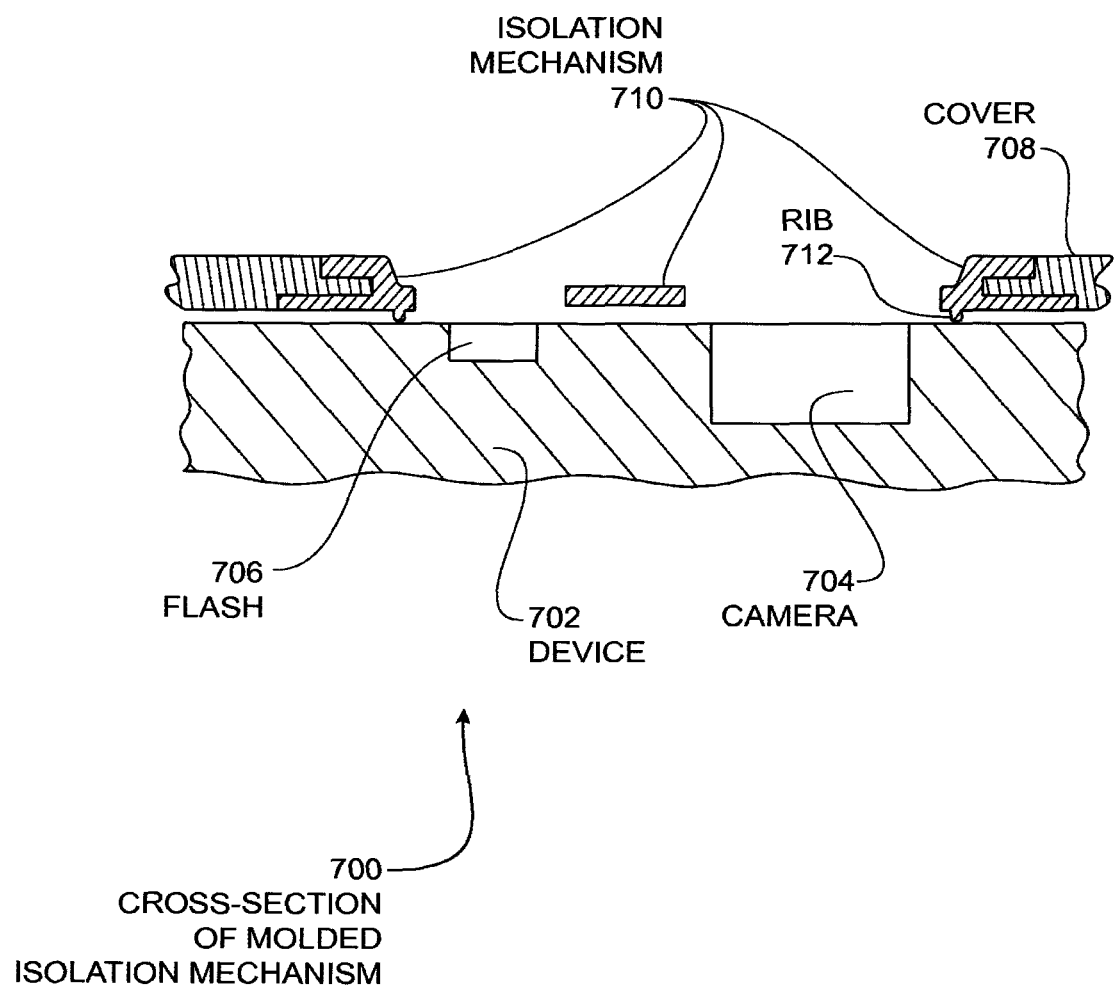
FIG. 7 is a cross-sectional illustration of a detailed view of still another embodiment showing a molded isolation mechanism.

FIG. 7 is a cross-section view of an embodiment 700 showing details of another embodiment of an isolation mechanism. The isolation mechanism 710 of embodiment 700 may be formed by molding the isolation mechanism 710 over a cover 708.

Embodiment 700 shows a device 702 that has a camera 704 and a flash 706. A cover 708 is illustrated as installed on the device 702.

An isolation mechanism 710 may be an overmolded portion of conformable or compressible material in the area of the camera 704 and flash 706.

The isolation mechanism 710 may include a rib 712 that may represent a raised portion of the isolation mechanism 710 that may come into contact with the device 702. The rib 712 may have a height and a width, where the height may be the distance perpendicular to the inside of the cover 708 and the width may be the contact area of the rib against the device 702. In some embodiments, the rib's height to width ratio may be 1:1, while in other embodiments, the ratio may be 2:1, 5:1, 10:1, or greater. In some embodiments, the ratio may be 1:2, 1:5, 1:10, or less.

Figure 8:
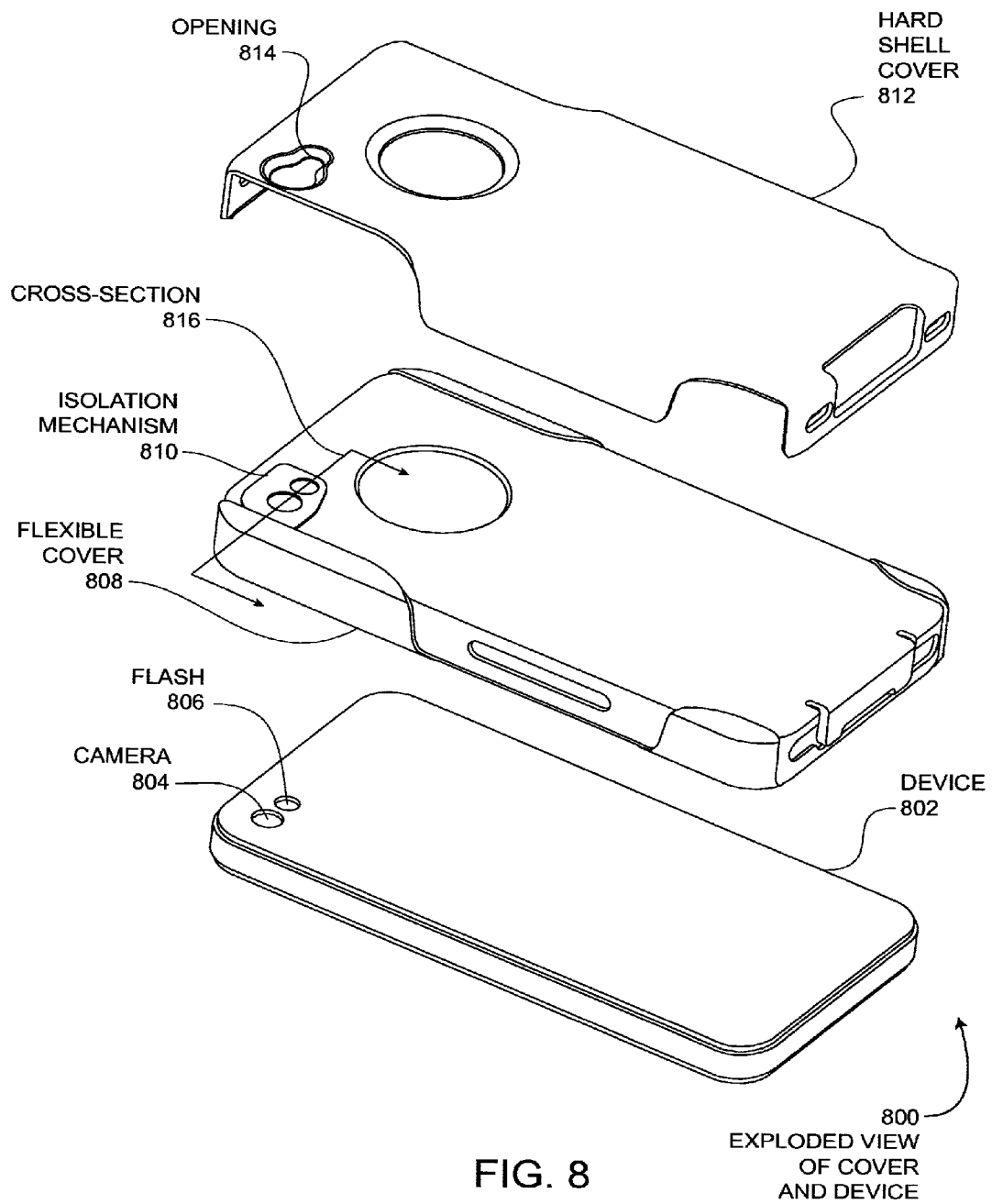
FIG. 8 is an isometric exploded view illustration of yet another embodiment of a cover and a device.

FIG. 8 is an isometric view of an embodiment 800 showing an exploded view of a cover for a cellular telephone. Embodiment 800 illustrates a device 802, which may be a cellular telephone, a flexible cover 808 and a hard shell cover 812.

The device 802 is illustrated with a camera 804 and flash 806.

The flexible cover 808 may be a silicone or other material that may be stretched to insert the device 802 into the cover 808. The flexible cover 808 may include an isolation mechanism 810 that serves to minimize light reflections and refractions in the area of the camera 804 and flash 806 when the cover is installed on the device 802.

The hard shell cover 812 may include an opening 814 in which the isolation mechanism 810 may reside when the cover is installed. The hard shell cover 812 may be of a different color than the flexible cover 808. In such instances, the isolation mechanism 810 may prevent reflected or refracted light from coming in contact with the hard shell cover 812 or reflecting off of the hard shell cover 812 and reaching the camera 804.

In some embodiments, an isolation mechanism may be mounted to a hard shell cover that fits over a flexible cover. In such embodiments, a hole or opening may be provided in the flexible cover through which an isolation mechanism may fit. The isolation mechanism may adhere to or be molded into a hard shell cover, and may come in contact with the device through the opening in the flexible cover.

Figure 9:
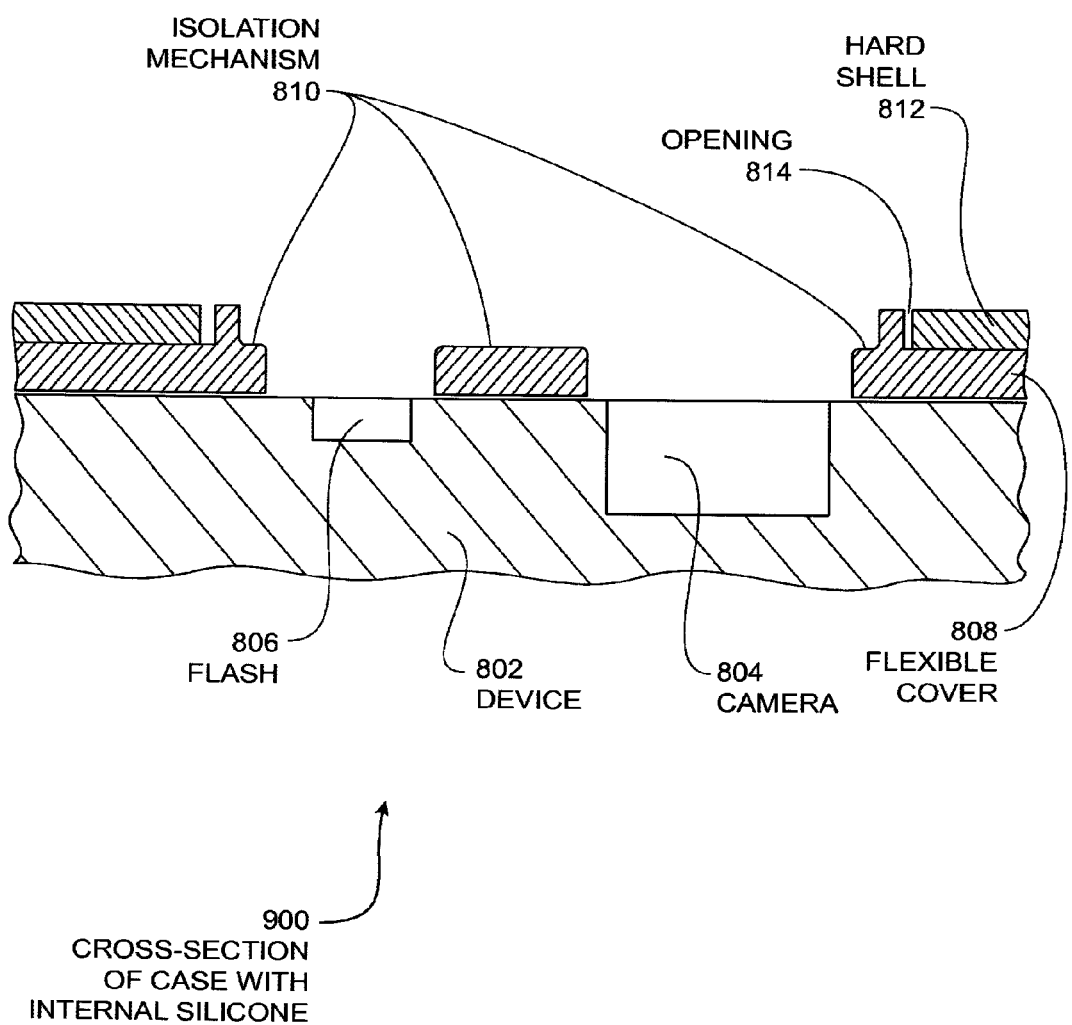
FIG. 9 is a cross-sectional illustration of a detailed view of the embodiment of FIG. 8.

FIG. 9 illustrates a cross-section view of an embodiment 900 showing details of the cross-section 816 of embodiment 800. Embodiment 900 is not to scale.

Embodiment 900 illustrates an embodiment where the isolation mechanism 810 may be integral with a flexible cover 808 and located inside a hard shell cover 812.

The device 802 is illustrated with a camera 804 and flash 806. Next to the device 802 is a flexible cover 808 that has an integral isolation mechanism 810. The isolation mechanism 810 may be formed as part of the flexible cover 808 and may eliminate or minimize reflected or refracted light from the flash 806 interfering with the camera 804.

The isolation mechanism 810 may be oriented within the opening 814 in the hard shell cover 812.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A protective cover for an electronic device having a light capturing feature and a light emitting feature, the protective cover comprising:
   a rear cover configured to be removably installed on the electronic device, the rear cover protecting at least a portion of the electronic device from damage when the rear cover is installed on the electronic device, the rear cover having an inner surface and an outer surface, the inner surface of the rear cover formed to contour at least one surface of the electronic device;
   a first opening in the rear cover that permits optical access to the light capturing feature of the electronic device when the protective cover is installed on the electronic device;
   a second opening in the rear cover that permits optical access to the light emitting feature of the electronic device when the protective cover is installed on the electronic device; and
   a light isolation mechanism mounted to the inner surface of the rear cover proximate the first and second openings, the light isolation mechanism comprising:

a camera opening aligned with the first opening in the rear cover; and a flash opening aligned with the second opening in the rear cover, wherein a portion of the light isolation mechanism is positioned between the camera opening and the flash opening, at least the portion of the light isolation mechanism extending in a thickness direction inward from the inner surface of the rear cover, an inner surface of the light isolation mechanism contacting a surface of the electronic device when the protective cover is installed on the electronic device, portions of the light isolation mechanism at edges of the flash opening blocking light emitted outward through the flash opening from reflecting off of the inner surface of the rear cover and reaching the light capturing feature when the protective cover is installed on the electronic device.

2. The protective cover of claim 1, wherein the light isolation mechanism comprises a conformable material.

3. The protective cover of claim 2, wherein the conformable material is configured to be compressed between the rear cover of the protective cover and the surface of the electronic device when the protective cover is installed on the electronic device.

4. The protective cover of claim 2, wherein the conformable material comprises felt, foam, or silicone.

5. The protective cover of claim 1, wherein the light isolation mechanism is configured to absorb light.

6. The protective cover of claim 1, wherein the light isolation mechanism is mounted to the inner surface of the rear cover using a pressure sensitive adhesive.

7. The protective cover of claim, wherein the light isolation mechanism comprises a material that acts as a gasket between the rear cover and the electronic device.

8. The protective cover of claim 1, wherein the light isolation mechanism is mounted to the inner surface of the rear cover by an overmolding process.

9. The protective cover of claim 1, wherein the camera opening in the light isolation mechanism is smaller than the first opening in the rear cover and the light isolation mechanism is at least partially visible through the first opening in the rear cover when the protective cover is installed on the electronic device, and wherein the camera opening of the light isolation mechanism is configured to limit incoming light reflected from a surface at the first opening from passing through the camera opening to the electronic device when the protective cover is installed on the electronic device.

10. The protective cover of claim 1, wherein the flash opening in the light isolation mechanism is smaller than the second opening in the rear cover and the light isolation mechanism is at least partially visible through the second opening in the rear cover when the protective cover is installed on the electronic device, and wherein the flash opening is configured to limit the light emitted outward from reflecting off of or becoming discolored by a surface at the second opening in the rear cover.

11. The protective case of claim 1, further comprising a first transparent cover over the first opening.

12. The protective case of claim 11, wherein the protective case is waterproof.

13. The protective case of claim 1, further comprising a second transparent cover over the second opening.

14. The protective case of claim 13, wherein the protective case is waterproof.

15. A removable protective cover for encasing an electronic device, the protective cover comprising:

a rear cover formed to contours of a rear surface of the electronic device, the rear cover having one or more apertures corresponding with two or more light transmission elements of the electronic device when the electronic device is at least partially encased within an interior portion of the protective cover; and a light isolation mechanism affixed to an inner surface of the rear cover around a perimeter portion of the one or more apertures, the light isolation mechanism protruding in a thickness direction toward the interior portion of the protective cover and providing an inner surface at least a perimeter portion of which contacts the rear surface of the electronic device when the electronic device is at least partially encased within the interior portion of the protective cover, the light isolation mechanism including:

a first optical opening formed in the light isolation mechanism such that a portion of the light isolation mechanism at a perimeter of the first optical opening is exposed within a first aperture of the one or more apertures and formed to correspond with a light emitting element of the two or more light transmission elements, the exposed perimeter portion around the first optical opening being positioned to intercept at least a portion of light passing outward from within the interior portion of the protective cover, and a second optical opening formed in the light isolation mechanism such that a portion of the light isolation mechanism at a perimeter of the second optical opening is exposed within either the first aperture or a second aperture of the one or more apertures and formed to correspond with a light capturing element of the two or more light transmission elements, the exposed perimeter portion around the second optical opening being positioned to intercept at least a portion of light passing toward the light capturing element.

16. A protective cover for an electronic device that has a camera and at least one flash, the protective cover comprising:

a removable rear shell portion having an inner surface, an outer surface, and a shell opening through which the camera and flash may operate when the electronic case is at least partially covered by the protective cover, the shell opening having a transparent cover that spans the shell opening at the outer surface of the rear shell portion;

a light isolating mechanism having a first surface and a second surface opposite the first surface, the light isolating mechanism being formed larger than a perimeter of the opening in the rear shell, at least a perimeter area of the first surface being affixed to the inner surface of the rear portion at a perimeter portion of the opening, the second surface formed to conform to the electronic device when the electronic device is at least partially covered by the protective cover, the light isolating mechanism further comprising a camera opening and a flash opening positioned to correspond respectively with the camera and the flash of the electronic device when the electronic device is at least partially covered by the protective cover, a perimeter of at least one of the camera opening and the flash opening being visible through the transparent cover 17. The protective cover according to claim 16, further comprising an adhesive, the adhesive affixing the first surface of the light isolating mechanism to the inner surface of the rear shell portion.

18. The protective cover according to claim 16, wherein the opening in the rear shell is divided by a rib, forming a first shell opening and a second shell opening, a portion of material forming the light isolation mechanism, between the camera opening and flash opening, being adjacent beneath the rib, and the camera opening and flash opening being entirely visible in the first shell opening and the second shell opening, respectively.

19. The protective cover according to claim 18, wherein the transparent cover covers both the first shell opening and the second shell opening.

* * * * *